United States Patent
Azenkot et al.

(10) Patent No.: US 9,882,710 B2
(45) Date of Patent: Jan. 30, 2018

(54) RESOLVING INTERACTION BETWEEN CHANNEL ESTIMATION AND TIMING RECOVERY

(71) Applicant: Applied Micro Circuits Corporation, Sunnyvale, CA (US)

(72) Inventors: Yehuda Azenkot, San Jose, CA (US); Bart R. Zeydel, El Dorado Hills, CA (US)

(73) Assignee: MACOM Connectivity Solutions, LLC, Lowell, MA (US)

( * ) Notice: Subject to any disclaimer, the term of this patent is extended or adjusted under 35 U.S.C. 154(b) by 0 days.

(21) Appl. No.: 15/191,229

(22) Filed: Jun. 23, 2016

(65) Prior Publication Data

US 2017/0373827 A1  Dec. 28, 2017

(51) Int. Cl.
*H04L 7/04* (2006.01)
*H04L 7/00* (2006.01)
*H04L 7/033* (2006.01)

(52) U.S. Cl.
CPC ............ *H04L 7/04* (2013.01); *H04L 7/0087* (2013.01); *H04L 7/0331* (2013.01)

(58) Field of Classification Search
USPC .................................. 375/233, 350, 340, 371
See application file for complete search history.

(56) References Cited

U.S. PATENT DOCUMENTS

| | | | | |
|---|---|---|---|---|
| 5,596,607 A * | 1/1997 | Larsson | ................ | H04B 7/005 375/340 |
| 5,615,233 A * | 3/1997 | Baum | ................ | H03H 21/0012 375/232 |
| 6,002,730 A * | 12/1999 | Kim | ................ | G11B 20/10009 375/326 |
| 8,989,325 B2 * | 3/2015 | Pustovalov | ......... | H04L 25/0236 375/316 |
| 2004/0030948 A1 * | 2/2004 | Yamazaki | ........ | G11B 20/10009 714/2 |
| 2004/0071206 A1 * | 4/2004 | Takatsu | .............. | H03H 21/0012 375/232 |
| 2009/0136219 A1 * | 5/2009 | Kikugawa | ........ | G11B 20/10009 386/334 |
| 2014/0211839 A1 * | 7/2014 | Mobin | ...................... | H04L 7/10 375/233 |

* cited by examiner

*Primary Examiner* — Eva Puente

(57) ABSTRACT

System and method of timing recovery for recovering a clock signal with reduced interaction between an adaptive channel estimator and the overall timing loop for correcting clock phase. The channel response estimation in the timing recovery loop is dynamically adapted to the current channel response that varies over time. The channel estimator includes compensation logic operable to detect and compensate a correction of clock phase ascribed to the channel estimator. The compensation logic can calculate the offset between a center of filter (COF) value and a COF nominal value, the offset indicative of the amount and direction of clock phase correction contributed by the channel estimator. Based on the offset, the compensation logic adjusts the estimates channel response by adjusting the tap weights of the channel estimator to correct the offset, thereby compensating the clock phase correction.

17 Claims, 8 Drawing Sheets

RESOLVING INTERACTION BETWEEN CHANNEL ESTIMATION AND TIMING RECOVERY

CROSS-REFERENCE

This application is related to co-pending, commonly assigned U.S. patent application Ser. No. 15/151,154, filed on May 10, 2016, titled "TIMING RECOVERY WITH ADAPTIVE RESPONSE ESTIMATION," the entire content of which is herein incorporated by reference in its entirety for all purposes.

TECHNICAL FIELD

The present disclosure relates generally to the field of signal processing in communications and, more specifically, to the field of timing recovery in signal processing.

BACKGROUND OF THE INVENTION

In communications systems, a transmitter sends data streams to a receiver in symbols, such as bits of data. As the receiver clock is typically not synchronized with the transmitter clock, the receiver needs to correctly recover the clock from the received signal itself. In addition, when data is transmitted over a communication channel, it is usually distorted in terms of phase and amplitude due to various types of noise, such as fading, oscillator drift, frequency and phase offset, and receiver thermal noise. At the receiver, the system is also subject to noise and timing jitter in a time domain. Therefore, the receiver needs a timing recovery process to obtain symbol synchronization, particularly to correct the clock delay and derive the optimal clock phase that is used to sample the received signal and achieve the best Signal-to-Noise Ratio (SNR).

The distortion and noise introduced through signal propagation over a communication channel are characterized in terms of channel response, which is usually frequency and time-dependent. The receiver determines the channel response and accordingly compensates for the channel distortion and noise through a channel estimation process. The transmitted signal usually includes a reference signal (the so-called "pilot signal") or a training sequence for channel estimation purposes. Typically, a channel estimator determines the channel response (or channel impulse response) on the particular carrier frequency and time instant by comparing the actual received signal with an expected signal, e.g., one that the receiver would have received under ideal channel conditions.

FIG. 1 illustrates the configuration of a timing recovery loop 100 in a receiver according to the prior art. As illustrated, the timing recovery loop 100 includes an Analog-to-Digital Converter (ADC) 110, an equalizer 111, a channel estimator 112, a delay element 113, a phase detector 114, a loop filter 115, and a Voltage Controlled Oscillator (VCO) 116. A received analog signal $R_x$ 101 is converted to a digital signal $d_k'$ 102 and then supplied to the equalizer 111 and the delay element 113. The equalizer 111 is used to render a flat frequency response in the signal and output an equalized signal and after slicing at the slicer 151, outputting the estimated symbol $a_k$ 103. The estimated symbol $a_k$ 103 is supplied to the channel estimator 112 to generate an estimated signal $d_k$ 104.

The channel estimator 112 includes channel response logic that correlates the signal transmitted from the transmitter (or "the transmitted signal") and the received signal 101 at the receiver by using a mathematical relation of a set of coefficients. Thus, the estimated signal $d_k$ output from the channel estimator 112 is an estimation of the transmitted signal that incorporates the channel response. The delay element 113 delays the digital signal $d_k'$ 102 to output symbols that have been processed by the timing loop 100, and thereby their characteristics have become known to the loop 100.

The phase detector 114 generates a phase error based on the difference between the delayed signal output from the delayed element 113 and the estimated signal $d_k$ 104. The loop filter 115 averages the phase error. The VCO adjusts the effective sampling frequency and phase based on the average phase error. As a result, a recovered clock signal 106 is generated from the VCO 116 and, in turn, used to clock the ADC 110 for sampling as well as to clock downstream processing logic. The performance of symbol synchronization can be indicated by a SNR or other parameters related to the noise level in the data stream.

The channel estimator 112 may include a Finite-Impulse-Response (FIR) filter composed of multiple filter taps. The multiple filter taps correspond to a number of consecutive samples used to generate an estimated sample. Conventionally, the channel estimator fixes the coefficients of a channel estimation filter, for example, by setting fixed tap weights of the FIR filter. The fixed tap weights may be configured based on known or estimated characteristics of the channel. Unfortunately, fixed channel estimation is incapable of adapting to time-varying channel response, resulting in possible large channel estimation errors.

Further, when a channel estimator applies an estimated channel response to generate an estimated signal, the channel estimator may correct the clock delay in the signal. This correction may undesirably interfere with the clock recovery process by the overall timing recovery loop, e.g., to be performed by a phase detector, a loop filter and a VCO in the same timing recovery loop. Particularly, the interference may cause recovered data symbols to shift from their optimized locations.

SUMMARY OF THE INVENTION

Accordingly, disclosed herein provide a mechanism to reduce or eliminate the interaction with respect to clock delay correction between channel estimation and timing recovery process in a timing recovery loop. Embodiments of the present disclosure employ a channel estimator capable of detecting a correction in clock delay resulted from a channel estimation process, and accordingly compensating the correction before sending an estimated signal to a phase detector and other downstream components for clock recovery. In some embodiments, an estimated channel response implemented in the channel estimator is based on a Finite Impulse Response (FIR) filter having tap weights adapted to time-variant channel responses of the communication channels. A Center of Filter (COF) value is used as a measure for clock delay correction by the channel estimation process. In some embodiments, COF is defined as a function of one or more tap weights depending on the configuration of the phase detector.

During operation, the tap weights of the FIR filter vary with time to adapt to variations in the communication channels. The current COF value of the FIR filter is calculated and compared with a nominal COF value to generate a COF offset. A set of selected tap weights are adjusted based on the COF offset by interpolating/extrapolating another set of selected tap weights. The adjusted tap weights are used for channel estimation, and in turn lead to reduced COF offset. As a result, clock delay correction introduced during the channel estimation process is compensated, and its interaction with the timing recovery loop can be effectively and advantageously prevented.

According to one embodiment of the present disclosure, a method of timing recovery for signals transmitted via serial link includes: generating an equalized signal responsive to a digital input signal; and generating an estimated signal responsive to the equalized signal according to an estimated channel response. A correction in clock delay associated with the digital input signal is caused by generating the estimated signal. The correction in clock delay is detected, and accordingly the estimated channel response is adjusted based on the detection to compensate the correction in clock delay.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

BRIEF DESCRIPTION OF THE DRAWINGS

Embodiments of the present invention will be better understood from a reading of the following detailed description, taken in conjunction with the accompanying figures, in which like reference characters designate like elements and in which.

RESOLVING INTERACTION BETWEEN CHANNEL ESTIMATION AND TIMING RECOVERY

Overall, embodiments of the present disclosure provide a timing recovery mechanism for recovering a clock signal with the capability of preventing undesirable interaction between the channel estimator and the overall timing recovery loop with respect to clock phase recovery. Particularly, if the estimated channel response is in the form of a Finite Impulse Response (FIR) filter, the offset between a current Center of Filter (COF) value and a nominal COF value is used as a measure for a clock phase correction resulted from the channel estimation process. Depending on the embodiments, a COF can be defined as a function of two selected tap weights or equal to a selected tap weight. The tap weights of the FIR filter are adjusted to decrease the offset, e.g., by interpolating/extrapolating the tap weights based on the offset. In this manner, the clock delay correction contributed by the channel estimation process is compensated and its potential interaction with the timing recovery process is reduced or eliminated.

Typically, a channel estimator causes clock delay correction when it is adaptive to the time-varying channel response. In the case of using an FIR filter, the adaptation may be implemented by adapting the tap weights of the FIR filter, examples of which are disclosed in co-pending, commonly assigned U.S. patent application Ser. No. 15/151,154, filed on May 10, 2016, titled "TIMING RECOVERY WITH ADAPTIVE RESPONSE ESTIMATION."

Figure 1:
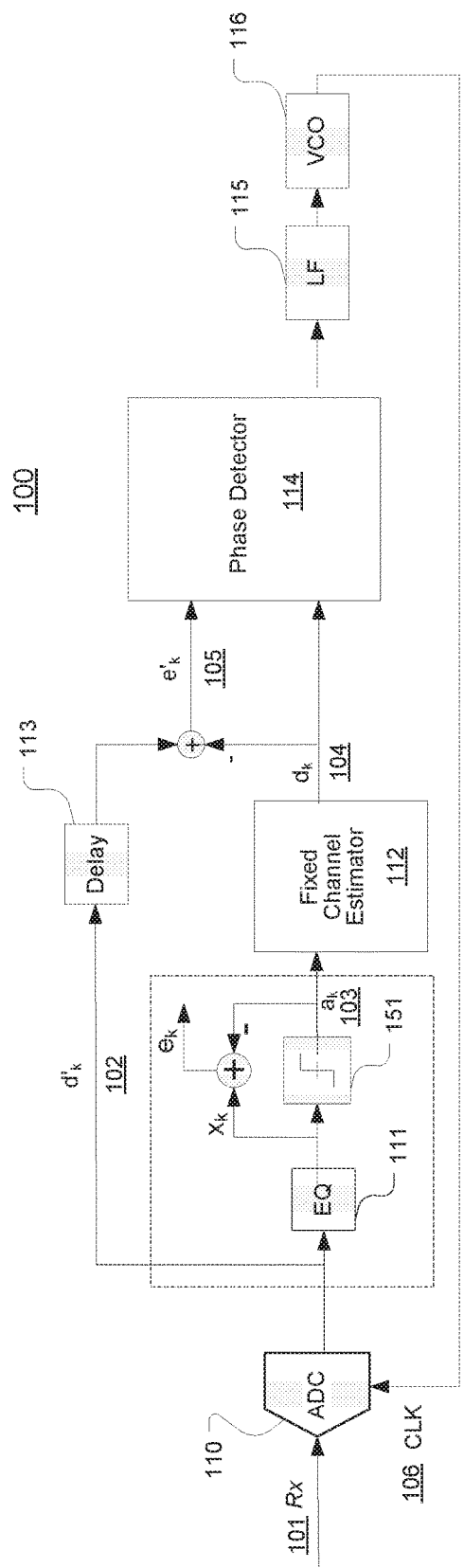
FIG. 1 illustrates the configuration of a timing recovery loop in a receiver according to the prior art.
Figure 2:
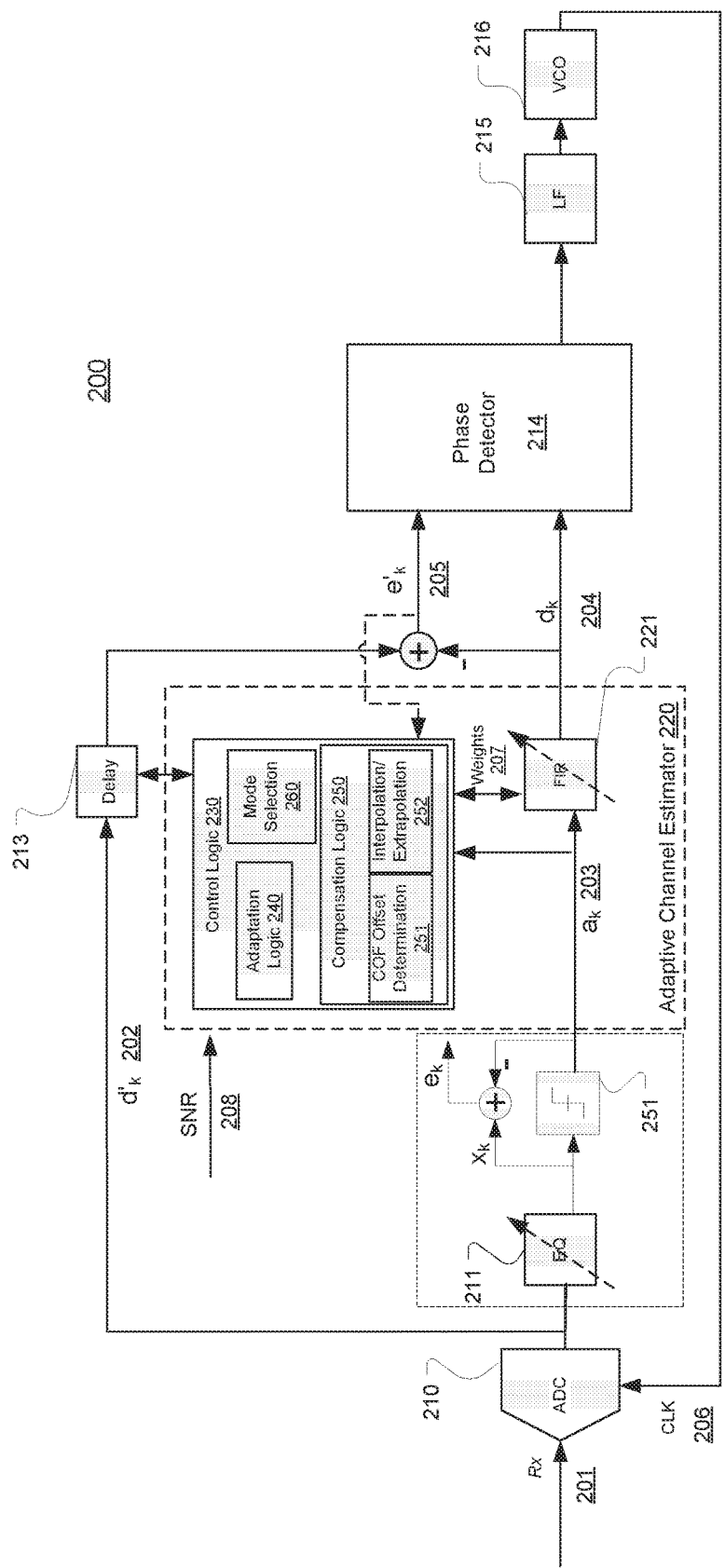
FIG. 2 illustrates an exemplary configuration of a timing recovery loop including an adaptive channel estimator capable of compensating clock delay correction introduced by channel estimation according to an embodiment of the present disclosure.

FIG. 2 illustrates an exemplary configuration of a timing recovery loop 200 in a receiver including an adaptive channel estimator 220 capable of compensating clock delay correction introduced by channel estimation according to an embodiment of the present disclosure. The timing recovery loop 200 includes an Analog-to-Digital Converter (ADC)

210, an equalizer 211, an adaptive channel estimator 220, a delay element 213, a phase detector 214, a loop filter 215, and a VCO 216. A received analog signal $R_x$ 201 is converted to a digital signal $d_k'$ 202 and then supplied to the equalizer 211 and the delay element 213. An equalized signal is output from the equalizer 211 and converted to the estimated symbol $a_k$ 203 after a slicer 251 and supplied to the adaptive channel estimator 220. The channel estimator 220 applies an estimated channel response (or channel impulse response) to generate an estimated signal $d_k$ 204.

The equalizer 211 may be a Feed Forward Equalizer (FFE) implemented using a Finite Impulse Response (FIR) filter or a decision-directed equalizer (DDE). In some embodiments, the FIR filter in the equalizer 211 utilizes fixed tap weights and, thus, a fixed channel response estimation. In some other embodiments, the equalizer 211 is adaptive to the time-varying channel response, for example, according to an LMS adaptation process with programmable step sizes. Examples of adaptive equalizers are disclosed in detail in the co-pending U.S. patent application Ser. No. 14/619,952, titled "CLOCK PHASE ADAPTATION FOR PRECURSOR ISI REDUCTION."

The delay element 213 is programmable and delays the ADC output according to the delays in the equalizer 211 and the channel estimator 220. In this manner, the characteristics of the delayed signal have become known to the equalizer 211 and the channel estimator 220. In some embodiments, the delay element 213 extracts a training sequence from the data stream for the channel estimation adaptation process.

The phase detector (PD) 214 generates a phase error based on the difference between the delayed signal (output from the delayed element 213) and the estimated signal $d_k$ 204. The phase error is averaged at the loop filter 215, and the clock phase is accordingly adjusted at the VCO 216. As a result, a recovered clock signal 206 is output from the VCO 216 and, in turn, used to drive the ADC 210 for sampling as well as for downstream processing logic (not shown).

The phase detector 214, loop filter 215, and VCO 216 can be implemented in any suitable configuration that is well-known in the art. For example, the phase detector 214 can be based on a Mueller Muller algorithm. The loop filter 215 can be a typical digital filter for a second-order Phase Lock Loop (PLL). The VCO 216 may include a PLL. Alternatively, the VCO 216 may be replaced with a phase interpolator using a programmable gain element, a digital interpolator, and/or an analog interpolator. For example, the digital interpolator includes a register and an adder. The analog phase interpolator receives a reference clock and outputs a clock signal with a phase that is a function of the input. Moreover, a timing recovery loop with adaptive channel estimation capable of compensating clock delay correction may include various other components that are well-known in the art without departing from the scope of the present disclosure.

The control logic 230 of the adaptive channel estimator 220 includes the adaptation logic 240, the compensation logic 250 and the mode selection logic 260. The control logic 230 may be implemented using logic circuitry, a programmable microcontroller, a combination thereof, or any other suitable means.

The adaptation logic 240 is configured to dynamically adapt the estimated channel response of a communication channel through which the signal 201 is transmitted. In a channel estimator that characterizes a channel response using a correlation of a set of channel estimation coefficients (e.g., arranged in a channel matrix), the channel estimation coefficients can be adapted based on the detected channel response variation over time. As a result, the timing recovery loop 200 can dynamically and accurately compensate for the channel distortion and noise applied by the channel.

It will be appreciated that the present disclosure is not limited to any specific type of channel estimator or any specific process or mechanism of characterizing a channel response. For example, a channel estimator performs channel estimation based on training symbols inserted in the data stream. The implementation of the adaptation logic 240 is dependent on the adaptive process in the specific embodiment, such as an LMS adaptation process or any other method that is well-known in the art.

In this example, the channel estimator 220 includes an FIR filter 221 operable to generate an estimated signal $d_k$ 204 using multiple taps, for instance, 8 taps. Controlled by the adaptation logic 240, the tap weights of the FIR filter 221 are adapted to the error signal $e_k'$ 205, which corresponds to the difference between the received signal $d_k'$ 202 with an added delay and the estimated signal output from the FIR filter 221. During adaptation, the tap weights are updated through an LMS adaptation process.

According to embodiments of the present disclosure, the control logic 230 in the adaptive channel estimator 220 further includes the compensation logic 250 configured to adjust the estimated channel response and thereby compensate for the clock phase correction resulted from the channel estimation process. In the illustrated example, the compensation logic 250 is equipped with COF offset determination logic 251 for calculating a COF offset based on the tap weights generated from the adaptation logic 240. The COF offset serves to indicate the amount and direction (positive or negative) of clock delay correction contributed by the channel estimation process. The interpolation/extrapolation logic 252 in the compensation logic 250 interpolates and/or extrapolates the tap weights to update a selected set of tap weights based on the COF offset, as described in greater detail below.

The adjusted tap weights 207 output from the control logic 230 are used for channel estimation and lead to reduced COF offset. As a result, clock delay correction introduced during the channel estimation process is compensated, and its interaction with the timing recovery loop can be effectively and advantageously prevented.

The mode selection logic 230 can select an operation mode of the channel estimator 220 by selectively disabling or enabling the adaptation logic 240 and the compensation logic 25, as described in greater detail below with reference to FIGS. 5-8.

Figure 3:
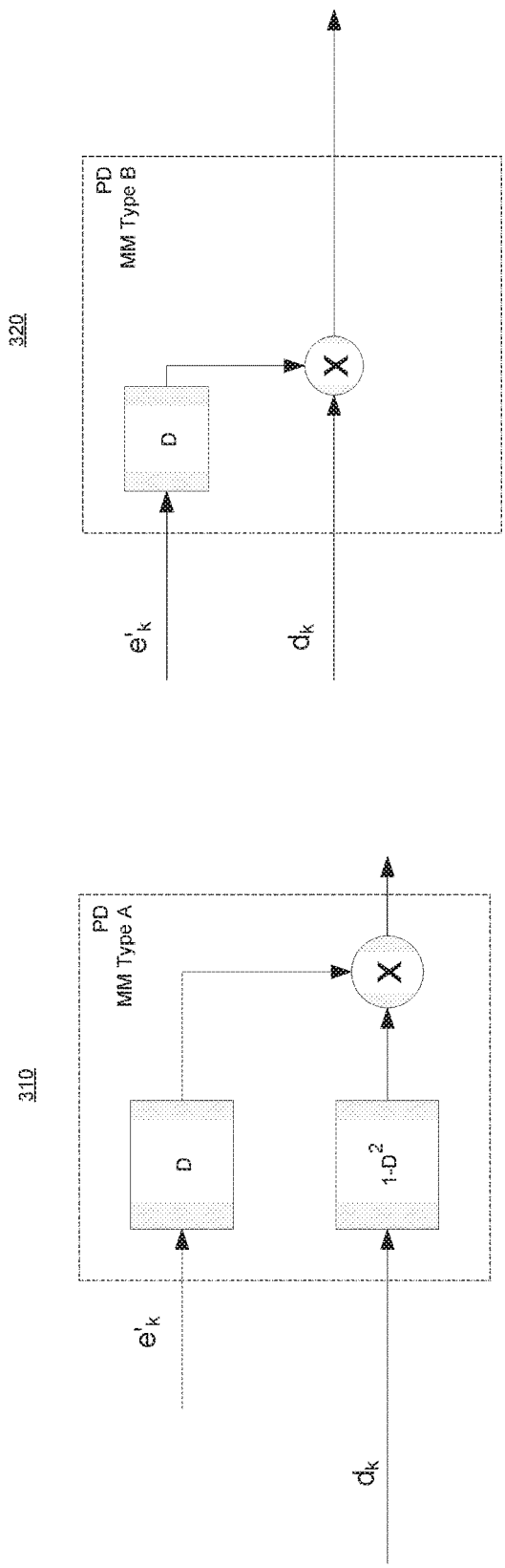
FIG. 3 illustrates the configuration of two types of phase detectors that can be used in a timing recovery loop in accordance with an embodiment of the present disclosure.

It will be appreciated that the present disclosure is not limited to specific definition of COF used as a measure for a clock delay correction introduced during channel estimation. In some embodiments, the definition of Center of Filter (COF) is dependent on the type of the phase detector coupled to the channel estimator (as shown in FIG. 3). In this example, $$COF = \begin{cases} w_1 - w_{-1} & PD \text{ Type } A \\ w_{-1} & PD \text{ Type } B \end{cases} \quad \text{(Equation 1)}$$

where $w_1$ is the weight of the tap after the reference tap (RefTap) and $w_{-1}$ is the weight of the tap before the RefTap, the RefTap being the tap associated with the maximum tap weight. The COF can be calculated and saved into a register continuously following any change of the channel estimator weights due to adaptation or COF correction.

FIG. 3 illustrates the configuration of two types of phase detectors that can be used in a timing recovery loop in accordance with an embodiment of the present disclosure. Diagram 310 shows the configuration of a type A phase detector according to the Mueller Muller algorithm. Diagram 320 shows the configuration of a type B phase detector according to the Mueller Muller algorithm. Definitions of COF corresponding to both types of phase detectors are presented in Equation 1. They can be used as the phase detector 214 in FIG. 2. Functions of these types of phase detectors are well known in the art and detailed description related thereto is omitted for brevity.

Figure 4:
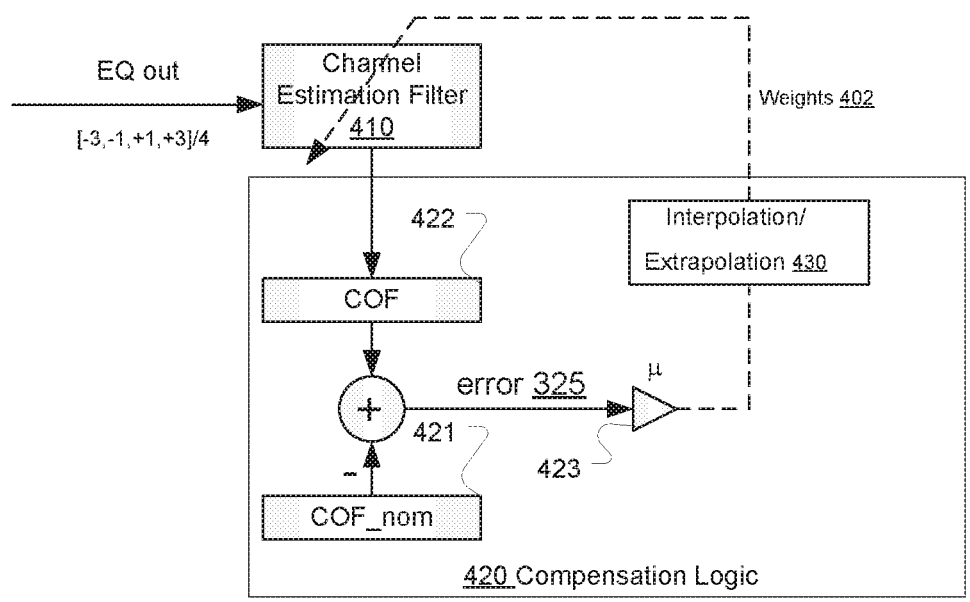
FIG. 4 illustrates an exemplary configuration of COF correction logic coupled to an adaptive channel estimation filter in accordance with an embodiment of the present disclosure.

FIG. 4 illustrates an exemplary configuration of COF correction logic 420 coupled to an adaptive channel estimation filter 410 in accordance with an embodiment of the present disclosure. The COF computation logic 422 can calculate the current COF value (or "the COF") of the channel estimator, for example as defined in Equation 1. The COF correction logic 420 includes a register 421 storing a nominal COF value (COF_nom), the COF determination logic 422 for computing the COF, an adder for generating a COF offset (or error), a multiplier 423 for timing the COF offset with a step size μ, and the interpolation/extrapolation logic 430.

During operation, if the COF is shifted relative to COF_nom, the COF can be corrected by modifying a set of selected taps of the channel estimation filter 410, e.g., the main three taps. An alternative approach is to modify all the weights of the channel estimation filter 410. Modification of the tap weights is performed by the interpolation/extrapolation logic 430 based on the main three or five taps, or etc. When the main five taps are used (e.g., the default mode), a linear interpolation is applied to get the three corrected main taps. When the main three taps are used, an interpolation or extrapolation can be used to get the corrected main three taps. Although embodiments of the present disclosure described herein use linear interpolation/extrapolation, various other suitable techniques, mechanisms, algorithms and methods that are well known in the art can be used to modify the tap weights for COF correction. For example, exponential or parabola interpolation can be used instead. Further, the tap weights or other type of coefficients of an estimated channel response can be updated for purposes of COF correction in any other suitable method or algorithm that is well known in the art.

More specifically, an error 425 is defined as a function of the COF offset and the step size and represented as:

$$e = \mu \cdot (COF - COF\_nom) \quad \text{(Equation 2)}$$

where μ is programmable and for instance can be set as $$\mu = 2^n, n = -4:+3,$$

the default value can be set to n=0.

In one embodiment, the main three taps are corrected by interpolating/extrapolating three tap weights (i=−1, 0, +1), given by:

$$y_0 = (w_1 - w_0) \cdot e + w_0, e \geq 0$$

$$y_1 = (w_1 - w_0) \cdot e + w_1$$

$$y_0 = (w_0 - w_{-1}) \cdot e + w_0, e < 0$$

$$y_{-1} = (w_0 - w_{-1}) \cdot e + w_{-1}$$

where the three old main weights are $w_{-1}$, $w_0$, $w_1$, and the updated 3 weights are $y_{-1}$, $y_0$, $y_1$ (shown as 302 in FIG. 3).

In another embodiment, the main three taps are corrected by interpolating/extrapolating five weights (i=−2, −1, 0, +1, +2). The updated main three weights $y_i$ (i=−1, 0, +1) are given by:

$$y_i = (w_{i+1} - w_i) \cdot e + w_i, e > 0, i = -1, 0, +1$$

$$y_i = (w_i - w_{i-1}) \cdot e + w_i, e < 0 i = -1, 0, +1$$

Or, $$y_0 = (w_1 - w_0) \cdot e + w_0, e \geq 0$$

$$y_0 = (w_0 - w_{-1}) \cdot e + w_0, e < 0$$

$$y_1 = (w_2 - w_1) \cdot e + w_1, e \geq 0$$

$$y_1 = (w_1 - w_0) \cdot e + w_1, e < 0$$

$$y_{-1} = (w_0 - w_{-1}) \cdot e + w_{-1}, e \geq 0$$

$$y_{-1} = (w_{-1} - w_{-2}) \cdot e + w_{-1}, e < 0$$

The RefTap location refers to the tap index of the main tap that has the maximum absolute tap weight. When the tap weights are updated due to adaptation or COF correction, the RefTap may change to another location (a different tap index). In some embodiments, once the location of a RefTap is changed as a result of updating the tap weights (e.g., the main three taps), the updated tap weights are discarded and the previous values of these tap weights are loaded back.

In some embodiments, a channel estimator can be characterized as operating in either an acquisition mode or a tracking mode as controlled by the mode selection logic 260 in FIG. 2. For instance, a COF_nom can be searched for and acquired in the acquisition mode, and then used as a fixed value for COF offset correction in the tracking mode.

A variety of techniques, processes, methods and algorithms can be used to acquire a COF_nom without departing from the scope of the present disclosure. In one embodiment, a COF_nom can be user-assigned based on the expected channel response. In some other embodiments, a COF_nom can be obtained through programmed tryouts using a number of candidate COF_nom values. The candidate value that yields an optimal performance is selected as the COF_nom used for subsequent signal processing.

In still some other embodiments, the COF of the channel estimator is obtained after a successful timing recovery acquisition where the equalizer SNR (e.g., 208 in FIG. 2) is above a programmable threshold, or the equalizer noise is below a programmable threshold. The equalizer noise can be obtained via averaging of a squared slicer error (e.g., $e_k$ in FIG. 2).

In an acquisition state, the timing recovery loop runs for a programmable number of symbols. The programmable number is stored in a register and used to define the duration of the acquisition process. The mean squared error or the SNR of the equalizer signal, the mean squared error of the estimated signal and the COF values are saved, while the tap weights updating based on computed COF offset is disabled. At the end of the acquisition, a COF that corresponds to an optimal SNR may be selected as the COF_nom. In the tracking state, the tap weights are updated based on the computed COF offset.

A timing recovery loop according to the present disclosure can operate in various modes depending on whether COF compensation and channel response adaptation are enabled. In some embodiments, optimal tap weights and/or COF_nom may be obtained in an initial searching stage, and used as initial values for the subsequent channel estimation process, as described in greater detail with reference to FIGS. 5-8. Processes described with reference to FIGS. 5-8 can be performed by the timing recovery loop 200 in FIG. 2 using different configurations.

Figure 5:
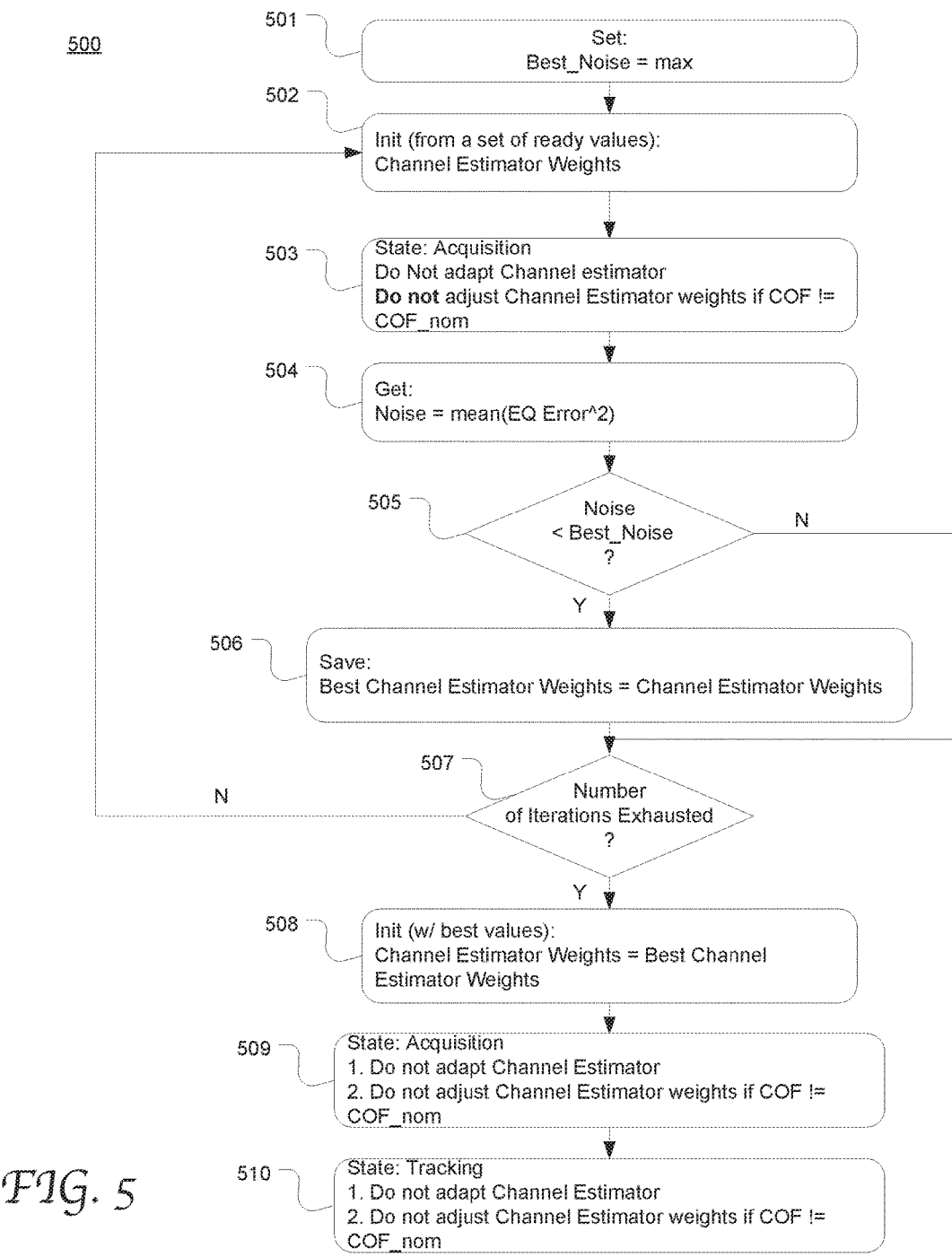
FIG. 5 is a flow chart of pseudo code for an exemplary channel estimation process that uses fixed channel response estimation according to an embodiment of the present disclosure.

FIG. 5 is a flow chart of pseudo code for an exemplary channel estimation process 500 that uses fixed channel response estimation according to an embodiment of the present disclosure. In this mode, both channel response adaptation and COF correction are disabled. The tap weights of the channel estimator are predetermined and fixed in the initial searching stage (blocks 502-507) as well as in the subsequent channel estimation stage (blocks 508-510).

More specifically, at 501, a noise threshold (Best_Noise) is set as "max." At 502, the channel estimator weights are initialized using a set of ready values. At 503, the acquisition state is configured such that the channel estimator is not adapted, and its weights are not adjusted even if the COF is not equal to the COF_nom. At 504, the equalizer error is averaged and saved as "Noise." At 505, it is determined if Noise is less than Best_Noise. If yes, the channel estimator weights are saved as the "Best Channel Estimator Weights" at 506. It is checked at 507 whether the number of iterations has been exhausted. If not, the foregoing 502-507 are repeated to obtain a set of weights that lead to a satisfactory noise level of the equalizer.

If t the number of iterations has been exhausted, the Best Channel Estimator Weights are set as the channel estimator weights for subsequent channel estimation process at 508. In both the acquisition state 509 and the tracking state 510, the channel weights of the channel estimator are neither adapted nor adjusted even if the COF is not equal to the COF_nom.

Figure 6:
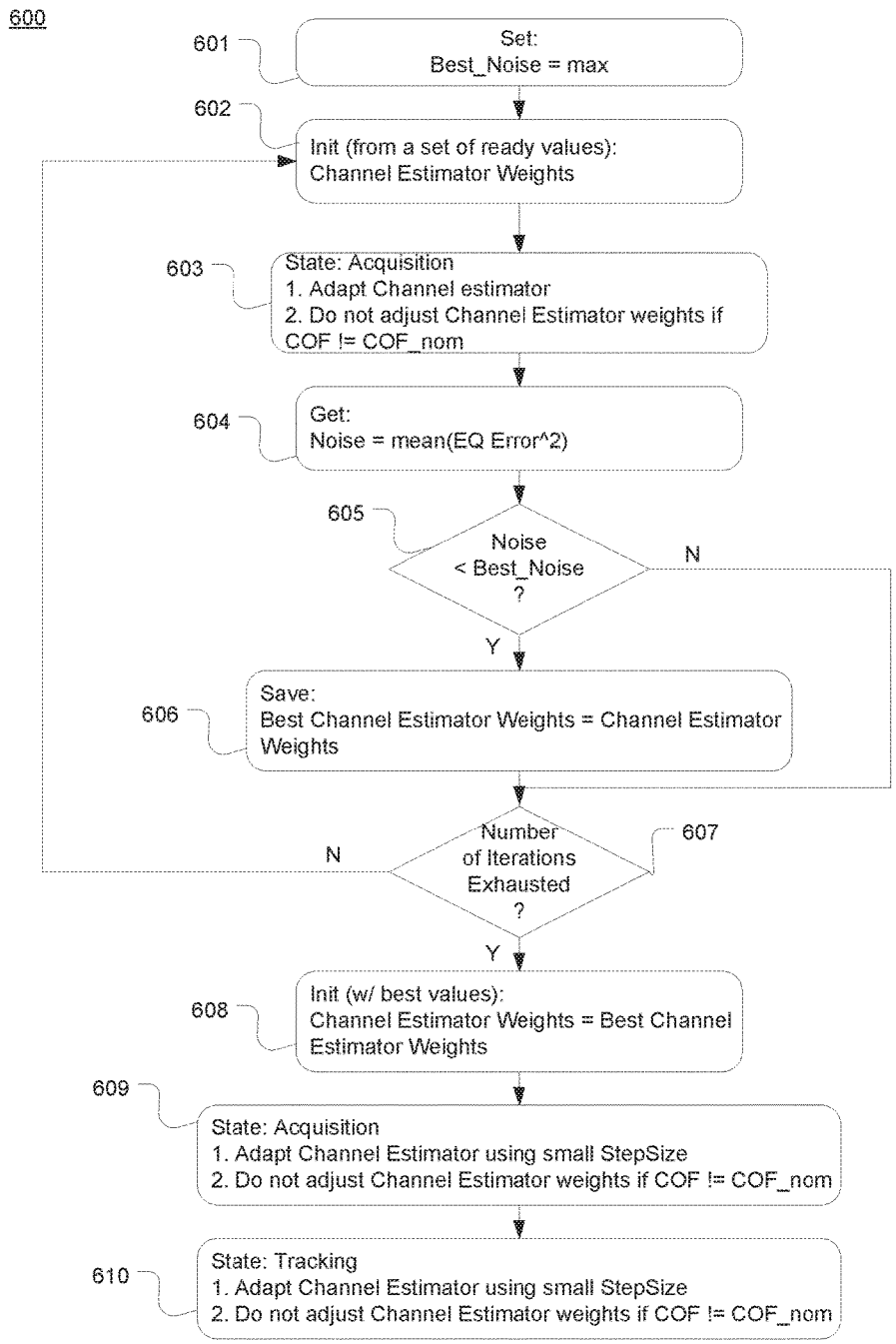
FIG. 6 is a flow chart of pseudo code for an exemplary channel estimation process with channel response adaptation enabled and COF correction disabled according to an embodiment of the present disclosure.

FIG. 6 is a flow chart of pseudo code for an exemplary channel estimation process 600 with channel response adaptation enabled and COF correction disabled according to an embodiment of the present disclosure. In this mode, the channel estimator weights are initialized in the acquisition state with ready values and are adapted iteratively based on the evaluation of the resulted noise in the initial searching process (602-607). The adaptation steps are set to be small values to reduce or eliminate the interaction in clock delay correction between the channel estimator and the overall timing recovery loop. For example, the adaptation steps for the main three taps are set to very small values.

More specifically, at 601, a noise threshold (Best_Noise) is set as "max." At 602, the channel estimator weights are initialized using a set of ready values. At 603, the acquisition state is configured such that the channel estimator is adaptive to channel response, but its weights are not adjusted even if the COF is not equal to COF_nom. At 604, the equalizer error is averaged and saved as "Noise." At 605, it is determined if Noise is less than Best_Noise. If yes, the channel estimator weights are saved as the "Best Channel Estimator Weights" at 606. It is checked at 607 whether the number of iterations has been exhausted. If not, the foregoing 602-607 are repeated to obtain a set of weights that lead to a satisfactory noise level of the equalizer.

If the number of iterations has been exhausted, the channel estimator weights are assigned with Best Channel Estimator Weights at 608. In the subsequent channel estimation process, both the acquisition state 609 and the tracking state 610, the channel weights of the channel estimator are adapted to the current channel response. However, the weights are not adjusted based on COF even if the COF is not equal to the COF_nom.

Figure 7:
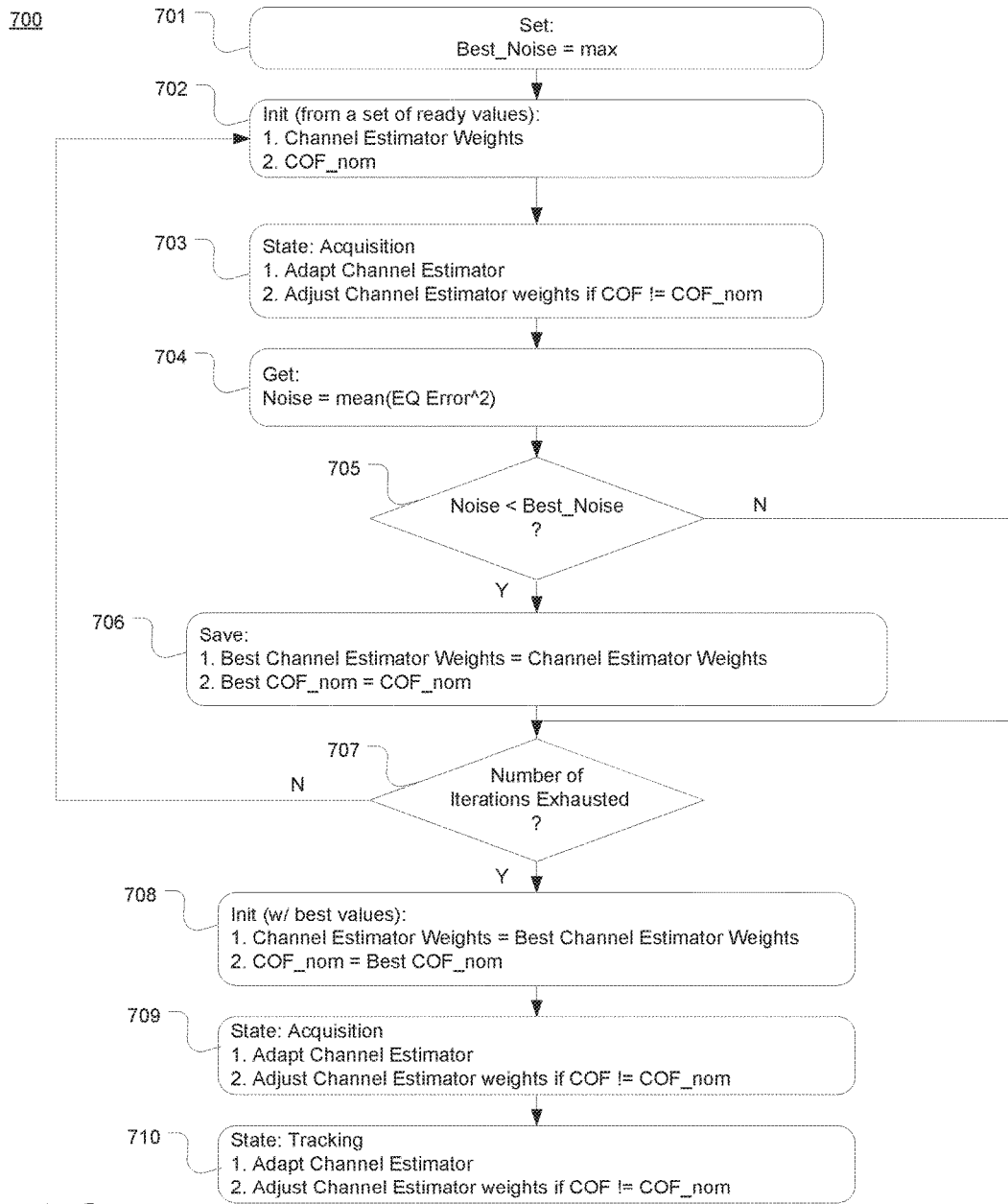
FIG. 7 is a flow chart of pseudo code for an exemplary channel estimation process with both channel response adaptation and COF correction enabled according to an embodiment of the present disclosure.

FIG. 7 is a flow chart of pseudo code for an exemplary channel estimation process 700 with both channel response adaptation and COF correction enabled according to an embodiment of the present disclosure. For instance, the main three taps are adapted during both the acquisition and tracking states. The COF is constantly modified, and the COF correction tries to correct the COF to keep it close to COF_nom.

In the acquisition state, the Channel Estimator weights and COF_nom are initialized. While applying channel estimator adaptation, the weights of the main three taps are corrected so the COF is kept close to COF_nom. After acquisition, if the SNR is below a programmable threshold, another set of channel estimator weights and COF_nom are initialized and the timing recovery loop is restarted until the SNR is above a certain threshold. An alternative approach is to select the best set of initial Channel Estimator weights and COF_nom that achieved the maximum SNR between couples of tryouts.

More specifically, at 701, a noise threshold (Best_Noise) is set as "max." At 702, the channel estimator weights and COF_nom are initialized using a set of ready values. At 703, the acquisition state is configured such that the channel estimator is adaptive to the channel response and continuously adjusted to compensate for the COF offset.

At 704, the equalizer error is averaged and saved as "Noise." At 705, it is determined if Noise is less than Best_Noise. If yes, the instant channel estimator weights are saved as the "Best Channel Estimator Weights," and the instant COF_nom is assigned to "Best COF_nom" at 706. It is checked at 707 whether the number of iterations has been exhausted. If not, the foregoing 702-707 are repeated to obtain a set of weights that lead to a satisfactory noise level of the equalizer.

If the number of iterations has been exhausted, the Channel Estimator Weights and the COF_nom are assigned with Best Channel Estimator Weights and the best COF_nom respectively at 708. In the subsequent channel estimation process, both the acquisition state 709 and the tracking state 710, the channel weights of the channel estimator are adapted to current channel response. Also, the weights are adjusted based on the COF offset.

Figure 8:
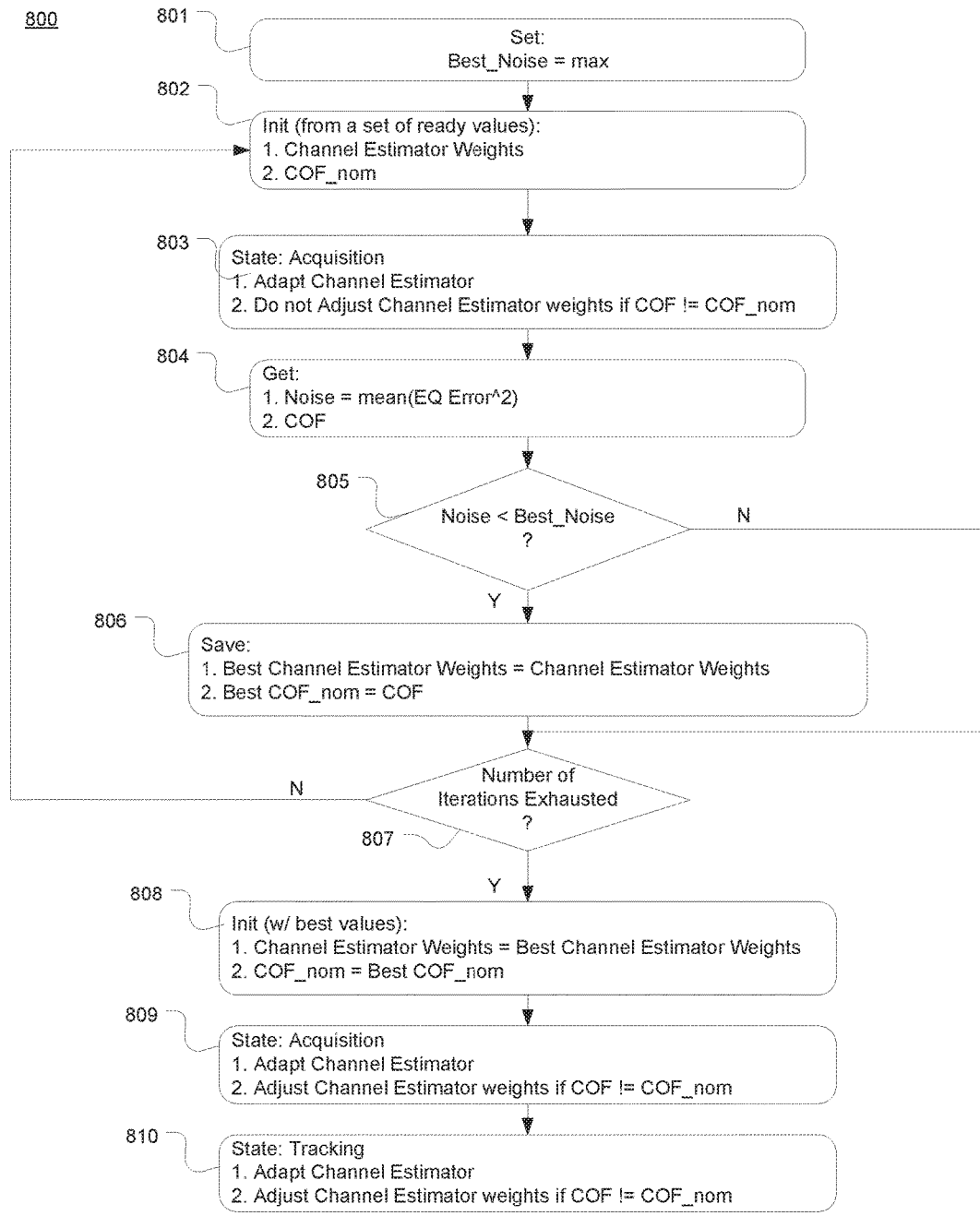
FIG. 8 is a flow chart of pseudo code for another exemplary channel estimation process with both channel response adaptation and COF correction enabled according to an embodiment of the present disclosure.

FIG. 8 is a flow chart of pseudo code for an exemplary channel estimation process 800 with both channel response adaptation and COF correction enabled according to an embodiment of the present disclosure. In this mode, the COF is not corrected during acquisition state. If the SNR obtained after acquisition is above a certain threshold, the achieved COF after acquisition is set as COF_nom. Then, during tracking, the main three taps are corrected, so the COF is the same as the set optimal COF_nom.

More specifically, at 801, a noise threshold (Best_Noise) is set as "max." At 802, the channel estimator weights and COF_nom are initialized using a set of ready values. At 803, the acquisition state is configured such that the channel estimator is adaptive to the channel response, but the Channel Estimator Weights are not adjusted based on the COF offset.

At 804, the equalizer error is averaged and saved as "Noise," and the COF is computed. At 805, it is determined if Noise is less than Best_Noise. If yes, the instant channel estimator weights are saved as the "Best Channel Estimator Weights," and the instant COF is assigned to "Best COF_nom" at 806. It is checked at 807 whether the number of iterations has been exhausted. If not, the foregoing 802-807 are repeated to obtain a set of weights and COF that lead to a satisfactory noise level of the equalizer.

If the number of iterations has been exhausted, the Channel Estimator Weights are assigned with Best Channel Estimator Weights at 808. Also, the COF_nom is assigned with Best COF_nom. In the subsequent channel estimation process, both the acquisition state 809 and the tracking state 810, the channel weights of the channel estimator are adapted to current channel response, and the weights are adjusted based on COF offset if the COF is not equal to COF_nom.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of timing recovery for signals transmitted via serial links, said method comprising:
    generating an equalized signal responsive to a digital input signal;
    generating an estimated signal responsive to said equalized signal according to an estimated channel response;
    detecting a correction in clock delay associated with said digital input signal, said correction caused by said generating said estimated signal; and
    adjusting said estimated channel response based on said detecting to compensate said correction in clock delay,
  wherein: said generating said estimated signal comprises applying a Finite Impulse Response (FIR) filter on said equalized signal; said FIR filter comprises a plurality of taps; and said adjusting said estimated channel response comprises adjusting tap weights of said FIR filter,
  wherein said detecting comprises:
    determining a difference of between two selected tap weights of said FIR filter; and
    determining an offset between said difference and a predetermined nominal value, wherein said offset indicative of said correction in clock delay.

2. The method of claim 1, wherein said adjusting said tap weights comprises updating tap weights for a first set of selected taps of said FIR filter based on said offset using an interpolation and/or extrapolation process, and wherein said updating is further based on tap weights of a second set of selected taps of said FIR filter.

3. The method of claim 1 further comprising determining said predetermined nominal value by:
    accessing a plurality of candidate values;
    adjusting said estimated channel response based on said plurality of candidate values respectively;
    monitoring Signal-to-Noise Ratios (SNRs) of said equalized signal resulted from said adjusting based on said plurality of candidate values respectively; and
    selecting said predetermined nominal value from said plurality of candidate values, wherein said predetermined nominal value results in an optimal SNR of said equalized signal.

4. The method of claim 2, wherein said first set of selected taps comprise a reference tap, a tap before said reference tap and a tap after said reference tap, and wherein said second set of selected taps comprise said reference tap, two taps before said reference tap and two taps after said reference tap.

5. The method of claim 1, wherein said two selected tap weights are associated with a tap before a reference tap and a tap after said reference tap.

6. The method of claim 2 further comprising:
    determining if said updating causes a change in reference tap location; and
    restoring tap weights for said first set of selected taps responsive to a determination of said change.

7. The method of claim 1, wherein said detecting further comprises:
    determining a predetermined nominal value of a selected tap weight of said FIR filter; and
    determining a difference between said selected tap weight and said nominal value, wherein said selected tap weight varies with time during said generating said estimated signal, and
  wherein further said adjusting said estimated channel response comprises updating tap weights of a first set of selected taps of said FIR based on said difference between said selected tap weight and said nominal value.

8. The method of claim 1 further comprising:
    dynamically adapting said estimated channel response based on a channel response that varies in time, wherein said correction in clock delay is caused by said dynamically adapting; and
    generating a recovered clock signal based on said estimated signal.

9. A device for signal processing, said device comprising:
    an equalizer configured to generate an equalized signal responsive to a digital input signal;
    a channel estimator coupled to said equalizer and configured to apply an estimated channel response responsive to said equalized signal to generated an estimated signal;
    a compensation logic coupled to said channel estimator and configured to:
        detect a correction in clock delay associated with said digital input signal, wherein said correction is introduced during channel estimation by said channel estimator; and
        adjust said estimated channel response based on said correction in clock delay to compensate said correction,
  wherein said channel estimator comprises a Finite Impulse Response (FIR) filter comprising a plurality of taps, each tap associated with a tap weight,
  and further comprising adaptation logic coupled to said channel estimator and configured to dynamically adapt tap weights of said FIR filter based on a difference between said estimated signal and said digital input signal, and wherein said correction in clock delay is related to dynamic adaptation of said estimated channel response,
  wherein said compensation logic comprises:
    a center of filter (COF) logic configured to determine a current difference between two selected tap weights of said FIR filter;
    a storage unit configured to store a nominal difference between said two selected tap weights; and
    an adder configured to generate an offset signal between said nominal difference and said current difference, said offset indicative of said correction in clock delay.

10. The device of claim 9, wherein said compensation logic further comprises interpolation/extrapolation logic configured to update a first set of selected tap weights of said FIR filter based on said offset and based on a second set of selected tap weights of said FIR filter.

11. The device of claim 9, wherein said compensation logic is further configured to
    determine if updating said first set of selected tap weights causes a change in reference tap location; and restore previous tap weights for said first set of selected taps responsive to a determination of said change.

12. The device of claim 9, wherein said COF logic is further configured to determine a current tap weight of an identified tap, and wherein said storage unit is further configured to store a nominal tap weight of said identified tap, and wherein further said adder is further configured to generate another COF offset between said nominal tap weight and said current tap weight, said another COF offset indicative of said correction in clock delay.

13. A receiver comprising:
an equalizer configured to generate an equalized signal responsive to a digital input signal;
a channel estimation filter coupled to said equalizer and configured to apply an estimated channel response responsive to said equalized signal to generate an estimated signal;
adaptation logic coupled to said channel estimation filter and configured to dynamically adapt said estimated channel response to a current channel response of a communication channel coupled to said receiver, wherein dynamical adaptation of said estimated channel response is operable to cause a correction of clock delay associated with said digital input signal; and
compensation logic coupled to said adaptation logic and configured to compensate said correction by updating said estimated channel response, wherein said compensation logic comprises;
a center of filter (COF) logic configured to determine a current COF value based on one or more tap weights of said channel estimation filter;
a storage unit configured to store a nominal COF; and
an adder configured to generate an offset of said current COF from said nominal COF.

14. The receiver of claim 13, wherein said compensation logic further comprises:
interpolation/extrapolation logic configured to update said estimated channel response by updating tap weights of a first set of selected taps in said channel estimation filter based on said offset.

15. The receiver of claim 13, wherein said current COF value is a function of a difference between two selected tap weights of said channel estimation filter.

16. The receiver of claim 13, wherein said current COF value represents a current tap weight of an identified tap.

17. The receiver of claim 13 further comprising mode selection logic configured to selectively disable said adaptation logic or said compensation logic.

* * * * *